(12) United States Patent
Tsai

(10) Patent No.: US 12,547,535 B1
(45) Date of Patent: Feb. 10, 2026

(54) MEMORY DEVICE AND IN-MEMORY SEARCHING METHOD

(71) Applicant: MACRONIX International Co., Ltd., Hsinchu (TW)

(72) Inventor: Wen-Che Tsai, Hsin-Chu (TW)

(73) Assignee: MACRONIX International Co., Ltd., Hsinchu (TW)

( * ) Notice: Subject to any disclaimer, the term of this patent is extended or adjusted under 35 U.S.C. 154(b) by 0 days.

(21) Appl. No.: 18/795,186

(22) Filed: Aug. 6, 2024

(51) Int. Cl.
*G06F 12/02* (2006.01)
*G06F 11/273* (2006.01)

(52) U.S. Cl.
CPC ........ *G06F 12/0223* (2013.01); *G06F 11/273* (2013.01)

(58) Field of Classification Search
CPC .......................... G06F 12/0223; G06F 11/273
See application file for complete search history.

(56) References Cited

U.S. PATENT DOCUMENTS

| | | | | |
|---|---|---|---|---|
| 2003/0126502 A1* | 7/2003 | Litt | .................... | G01R 31/3177 714/39 |
| 2007/0028039 A1* | 2/2007 | Gupta | .................... | G11C 15/00 711/108 |
| 2010/0318560 A1* | 12/2010 | Morishita | ............... | H04L 45/00 707/769 |
| 2010/0328981 A1 | 12/2010 | Deshpande et al. | | |
| 2017/0075628 A1* | 3/2017 | Ji | .......................... | G06F 3/0688 |
| 2017/0285949 A1* | 10/2017 | Trika | ....................... | G06F 12/02 |
| 2019/0236103 A1 | 8/2019 | Bosshart et al. | | |
| 2022/0059147 A1 | 2/2022 | Van Vaerenbergh et al. | | |
| 2023/0036141 A1 | 2/2023 | Tseng et al. | | |

FOREIGN PATENT DOCUMENTS

| | | |
|---|---|---|
| TW | 201820320 | 6/2018 |
| TW | 202349400 | 12/2023 |

* cited by examiner

*Primary Examiner* — Michael Krofcheck
(74) *Attorney, Agent, or Firm* — J.C. PATENTS

(57) ABSTRACT

A memory device and in-memory searching method are provided. The memory device is, for example, a three dimensional NAND flash memory circuit, and provides a storage media with high-performance and high-capacity. The memory device includes an address scanner, a searching data transmitter, a readout data sensor and comparator, an error bit detector, and a matching status processor. The address scanner provides a scanned address information within a search setting range. The readout data sensor and comparator compares a readout data with a search data bit by bit to generate a comparison result. The error bit detector determines a matching information of the readout data and the search data according to the comparison result. The matching status processor generates a matching address information.

16 Claims, 16 Drawing Sheets

MEMORY DEVICE AND IN-MEMORY SEARCHING METHOD

BACKGROUND

Technical Field

The disclosure relates to a memory device and an in-memory searching method, and in particular to a memory device and an in-memory searching method that can increase a data width of search data.

Description of Related Art

In recent technology field, in-memory searching is widely studied and used to improve energy efficiency. Generally speaking, the conventional technology requires physical redesign of the input/output interface and the driving path of word lines, which is relatively complicated for a three dimensional NAND flash memory circuit. A data width of search data may be limited by the number of word lines, resulting in a situation where the efficiency of searching operations cannot be improved.

SUMMARY

The disclosure provides a memory device and an in-memory searching method, which can effectively increase a data width of search data.

The memory device of the disclosure includes an address scanner, a searching data transmitter, a readout data sensor and comparator, an error bit detector, and a matching status processor. The address scanner receives a search setting range and provides a scanned address information within the search setting range. The searching data transmitter is configured to transmit a search data. The readout data sensor and comparator reads a readout data from a memory cell array according to the scanned address information, and compares the readout data and the search data bit by bit to generate a comparison result. The error bit detector is coupled to the readout data sensor and the comparator, and determines a matching information of the readout data and the search data according to the comparison result. The matching status processor is coupled to the error bit detector and determines whether to generate a matching address information based on the scanned address information according to the matching status.

The in-memory searching method of the disclosure includes: receiving the search setting range and providing the scanned address information in the search setting range; transmitting the search data to the readout data sensor and comparator; reading the readout data from the memory cell array by the readout data sensor and comparator according to the scanned address information; comparing the readout data and the search data bit by bit to generate the comparison result; determining the matching information of the readout data and the search data according to the comparison result; and, determining whether to generate the matching address information based on the scanned address information according to the matching status.

Based on the above, the memory device of the disclosure sets the scanned address information corresponding to a page address according to the search setting range, and compares the readout data and search data in a memory page bit by bit by the readout data sensor and comparator to generate the comparison result, and then through an analysis operation on the comparison result, the matching address information of the page address that matches the search data may be obtained.

DESCRIPTION OF THE EMBODIMENTS

Figure 1:
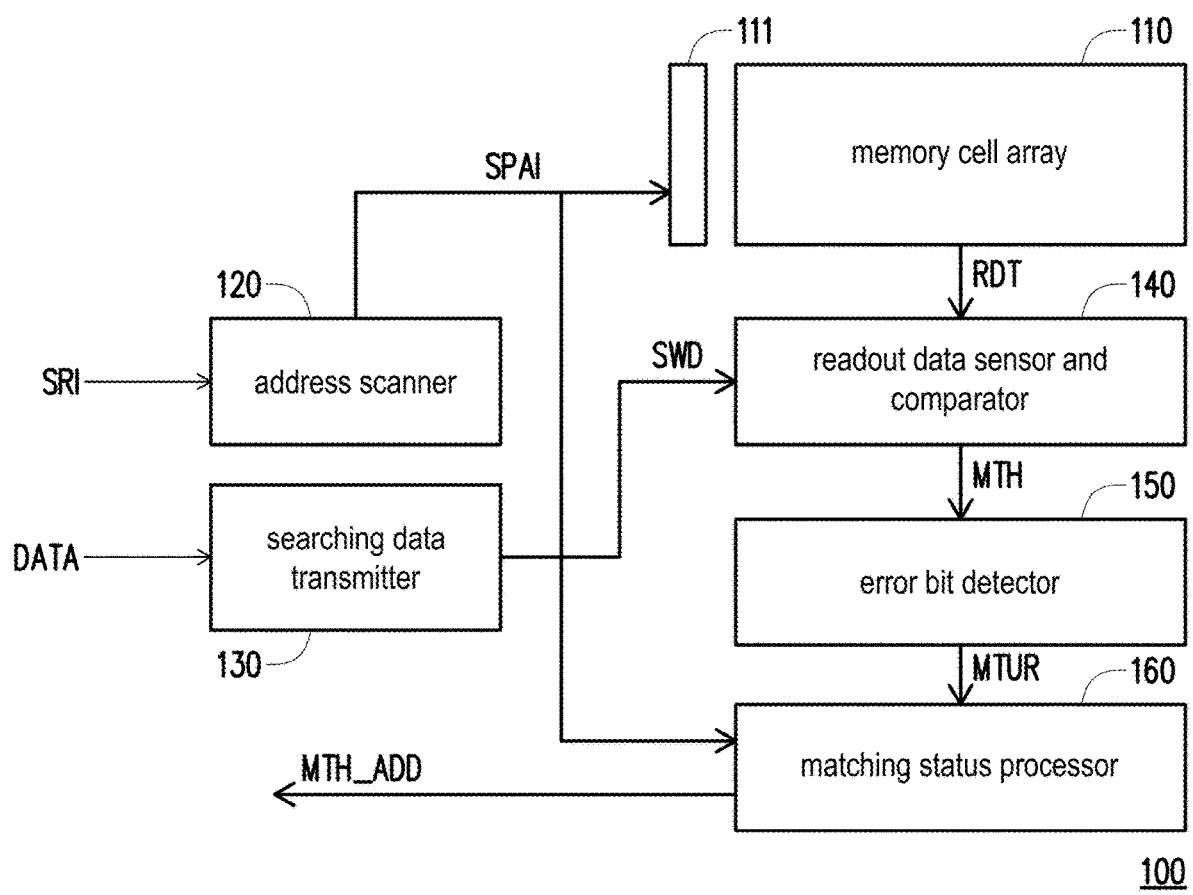
FIG. 1 is a schematic diagram of a memory device according to an embodiment of the disclosure.

Referring to FIG. 1, FIG. 1 is a schematic diagram of a memory device according to an embodiment of the disclosure. A memory device 100 includes a memory cell array 110, an address scanner 120, a searching data transmitter 130, a readout data sensor and comparator 140, an error bit detector 150, and a matching status processor 160. The address scanner 120 is coupled to an address decoder 111 of the memory cell array 110. The address scanner 120 receives a search setting range SRI, and the address scanner 120 is used to provide a scanned address information SPAI within the search setting range SRI. In this embodiment, the scanned address information SPAI may be a page address information, and the address decoder 111 may be a row address decoder. The address decoder 111 may open a memory page corresponding to the scanned address information SPAI in the memory cell array 110 according to the scanned address information SPAI.

The searching data transmitter 130 is coupled to the readout data sensor and comparator 140. The searching data transmitter 130 may receive an externally transmitted data DATA, and transmit the received data DATA as a search data SWD to the readout data sensor and comparator 140.

The readout data sensor and comparator 140 is coupled to the memory cell array 110. The readout data sensor and comparator 140 is used to read a readout data RDT from the memory cell array 110 according to the scanned address information SPAI. The readout data sensor and comparator 140 may temporarily store the readout data RDT and compare the readout data RDT with the search data SWD bit by bit to generate a comparison result MTH. The error bit detector 150 is coupled to the readout data sensor and comparator 140. The error bit detector 150 receives the comparison result MTH generated by the readout data sensor and comparator 140, and determines a matching information MTUR of the readout data and the search data by analyzing the comparison result.

The matching status processor 160 is coupled to the error bit detector 150 and the address scanner 120. The matching status processor 160 may receive the scanned address information SPAI and the matching information MTUR, and determine whether to generate a matching address information MTH_ADD according to the scanned address information SPAI based on the scanned address information SPAI and the matching information MTUR.

In this embodiment, the search data SWD may be a data word and may have multiple bits. Each of the bits in the search data SWD may be logic 1, logic 0, or don't care. The readout data RDT may also be the data word. Each of the bits in the readout data RDT may be logic 1, logic 0, or wild card. In this embodiment, the search data SWD may have a don't care flag to indicate whether the data of the corresponding bit is don't care. The readout data RDT may have a wild card flag to indicate whether the data of the corresponding bit is wild card.

In addition, in a bit-by-bit comparison operation of the readout data RDT and the search data SWD performed by the readout data sensor and comparator 140, the readout data sensor and comparator 140 may perform an XOR operation or an XNOR operation on the two bits corresponding to the readout data RDT and the search data SWD. When the readout data sensor and comparator 140 performs a bit comparison operation through the XOR operation, the comparison result MTH equal to logic value 0 indicates that the comparison result is the same; in contrast, the comparison result MTH equal to logic value 1 indicates that the comparison result is different. When the readout data sensor and comparator 140 performs the bit comparison operation through the XNOR operation, the comparison result MTH equal to logic value 0 indicates that the comparison result is different; in contrast, the comparison result MTH equal to logic value 1 indicates that the comparison result is the same.

It is worth noting that when the bit in the readout data RDT is wild card, or the bit in the search data SWD is don't care, the corresponding comparison result MTH generated by the readout data sensor and comparator 140 is the same. Of course, when the bit in the readout data RDT is wild card and the bit in the search data SWD is don't care, the corresponding comparison result MTH generated by the readout data sensor and comparator 140 is also the same.

On the other hand, the searching data transmitter 130 may receive multiple pieces of the data DATA. When performing a searching operation, the searching data transmitter 130 may combine one or more sub-search data according to an index command to generate the search data SWD. In this embodiment, each of the sub-search data has a preset fixed data length. That is to say, through the index command, the searching data transmitter 130 may dynamically adjust the data length of the search data SWD, and the readout data sensor and comparator 140 may perform the comparison operation on the search data SWD of different data lengths.

Incidentally, each of the sub-search data in the search data SWD of this embodiment may be a binary data or a ternary data. When the search data SWD is the ternary data, the search data SWD has multiple data bits and multiple wild card flags respectively corresponding to the data bits. Therefore, when each of the sub-search data is the ternary data, the total data length of the search data SWD sent by the searching data transmitter 130 is doubled.

Figure 2:
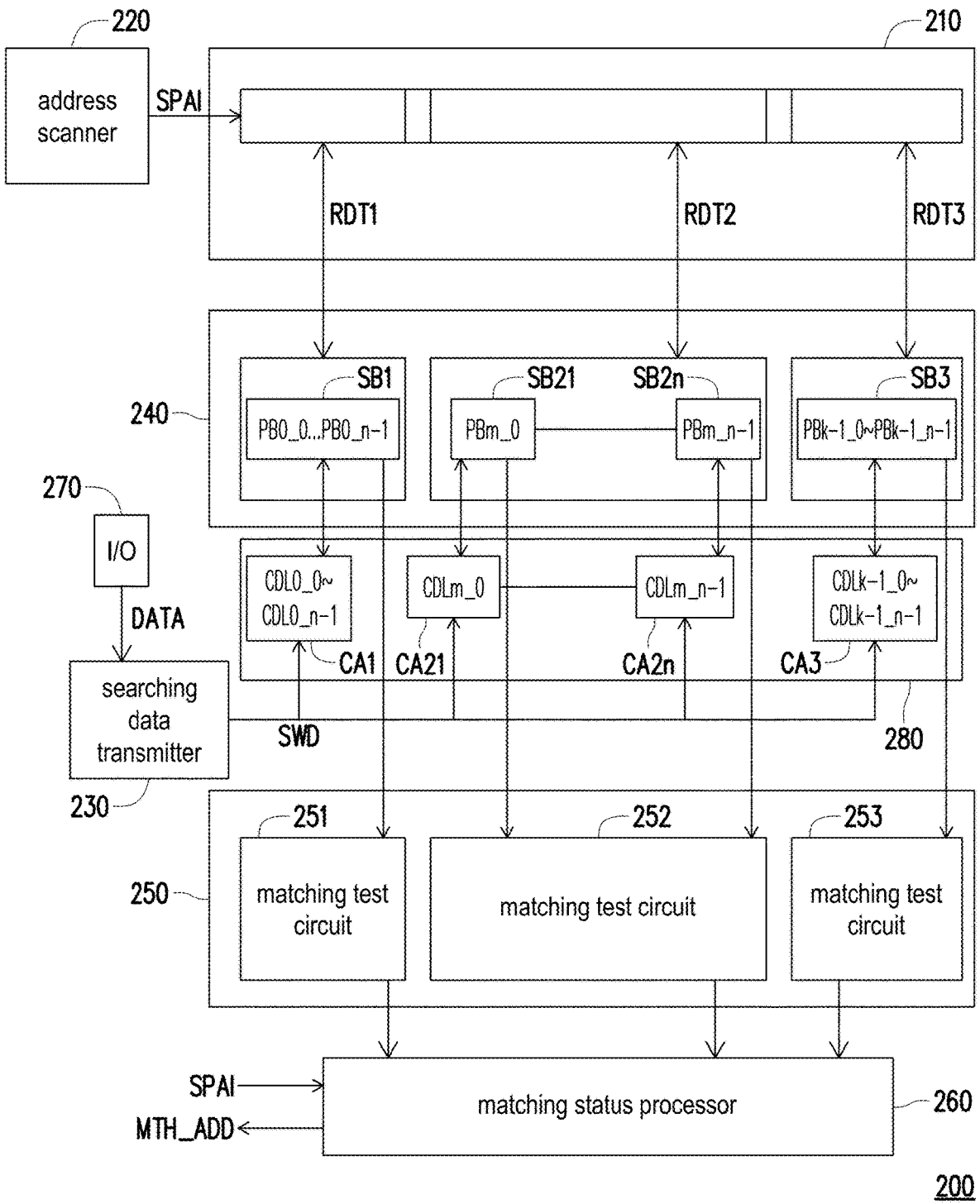
FIG. 2 is a schematic diagram of a memory device according to another embodiment of the disclosure.

Referring to FIG. 2, FIG. 2 is a schematic diagram of a memory device according to another embodiment of the disclosure. A memory device 200 includes a memory cell array 210, an address scanner 220, a page buffer 240, a cache block 280, a searching data transmitter 230, an error bit detector 250, and a matching status processor 260. The address scanner 220 is used to provide the scanned address information SPAI to the memory cell array 210. The memory cell array 210 may provide the data stored in the corresponding memory cells according to the received scanned address information SPAI to generate multiple readout sub-data RDT1 to RDT3.

The page buffer 240 is included in the readout data sensor and comparator. The page buffer 240 may receive and temporarily store the readout sub-data RDT1 to RDT3. On the other hand, the searching data transmitter 230 may receive the data DATA from an input/output terminal 270, and generate the search data SWD according to the received data DATA. The searching data transmitter 230 sends the search data SWD to the cache block 280, and divides the search data SWD into multiple sub-search data to be respectively stored in multiple sub-blocks CA1, CA21-CA2$n$, and CA3 of the cache block 280. The sub-blocks CA1, CA21-CA2$n$ corresponding to the cache block 280 in the page buffer 240 respectively have multiple sub-buffers SB1, SB21-SB2$n$, and SB3. The sub-buffer SB1 stores multiple bits PB0_0-PB0_$n$-1 in the readout sub-data RDT1; the sub-buffers SB21-SB2$n$ respectively store multiple bits PBm_0-PBm_n-1 in the readout sub-data RDT2; the sub-buffer SB3 stores multiple bits PBk-1_0-PBk-1_n-1 in the readout sub-data RDT3. The sub-block CA1 of the cache block 280 stores multiple bits CDL0_0-CDL0_$n$-1 of the sub-search data; the sub-blocks CA21-CA2$n$ respectively store multiple bits CDLm_0-CDLm_n-1 of the sub-search data; the sub-block CA3 stores multiple bits CDLk_0-CDLk-1_n-1 of the sub-search data.

Furthermore, the sub-buffers SB1, SB21-SB2$n$, and SB3 in the page buffer 240 may respectively compare the bits of the sub-search data and the readout sub-data bit by bit, thereby generating corresponding multiple sub-comparison results.

The error bit detector 250 includes multiple matching test circuits 251-253. The page buffer 240 of each of the matching test circuits 251-253 generates each of the sub-comparison results, and by analyzing each of the sub-comparison results, the corresponding matching information may be generated.

The matching status processor 260 is coupled to the error bit detector 250 and generates the matching address information MTH_ADD according to the matching information generated by the error bit detector 250 and the scanned address information SPAI.

Figure 3:
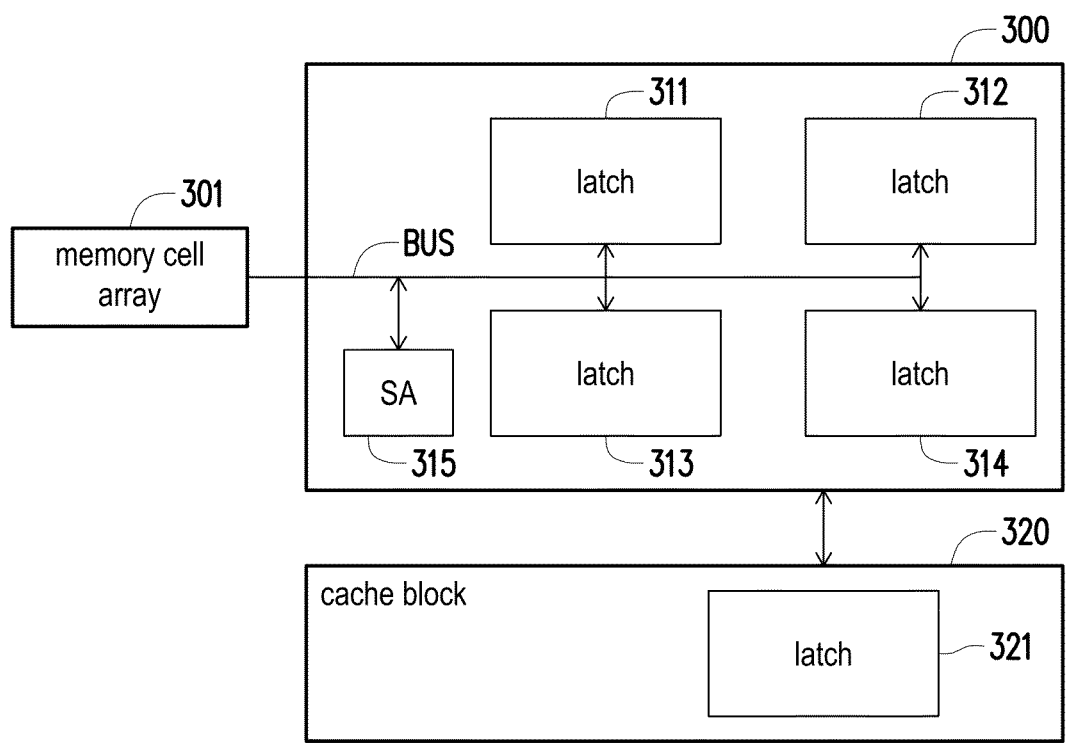
FIG. 3 is a schematic diagram of an implementation of a readout data sensor and comparator according to an embodiment of the disclosure.

Referring to FIG. 3, FIG. 3 is a schematic diagram of an implementation of a readout data sensor and comparator according to an embodiment of the disclosure. A readout data sensor and comparator 300 includes a sense amplifier 315 and multiple latches 311 to 314. The sense amplifier 315 and the latches 311 to 314 are jointly coupled to a bus BUS and coupled to a memory cell array 301 through the bus BUS. In addition, the readout data sensor and comparator 300 is coupled to a cache block 320. The cache block 320 may have one or more latches 321. The cache block 320 is used to store the search data.

When the readout data of the memory cell array 301 is obtained, the memory cell array 301 may provide the data to the bus BUS. The sense amplifier 315 is used to sense the data on the bus BUS to obtain the readout data. Further, the sense amplifier 315 may store the generated readout data to any one of the latches 311 to 314 through the bus BUS.

When performing the comparison operation of the readout data and the search data, the cache block 320 may provide the search data to the bus BUS, and compare with the reading data in the latches 311 to 314 bit by bit.

Figure 4:
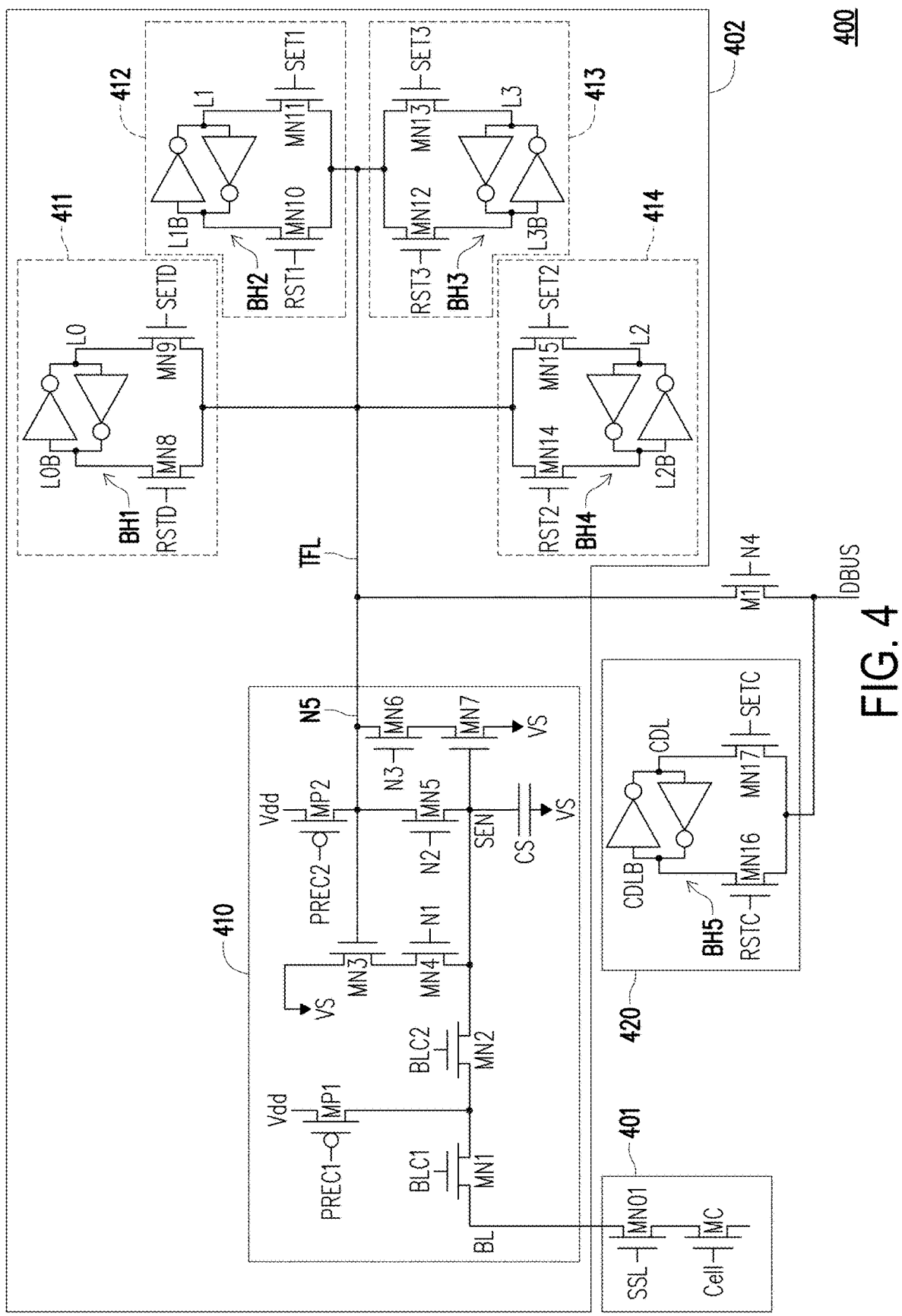
FIG. 4 is a schematic diagram of another implementation of the readout data sensor and comparator according to the embodiment of the disclosure.

Referring to FIG. 4 below, FIG. 4 is a schematic diagram of another implementation of the readout data sensor and comparator according to the embodiment of the disclosure. A readout data sensor and comparator 400 includes a page buffer 402. The page buffer 402 is coupled to a memory cell array 401 and a cache block 420. The buffer 402 includes the sense amplifier 410 and latches 411 to 414. A memory cell MC is coupled to a bit line BL through a transistor MN01, and is coupled to the sense amplifier 410 through the bit line BL. The memory cell MC provides a stored data Cell. The sense amplifier 410 includes transistors MP1, MP2, MN1-MN7, and a capacitor CS. The transistors MP1 and MP2 are respectively controlled by signals PREC1 and PREC2, and provide a voltage Vdd to precharge second terminals of the transistors MP1 and MP2. The transistors MN1 and MN2 are respectively controlled by signals BLC1 and BLC2, and allow the data of the memory cell MC to be read out to the capacitor CS when turned on. The transistors MN3 and MN4 are connected in series between the capacitor CS and a reference voltage terminal VS; the transistors MN6 and MN7 are connected in series between the capacitor CS and the reference voltage terminal VS; and the transistor MN5 is coupled between the capacitor CS and the transistor MP2. The transistors MN3-MN7 are respectively controlled by signals N5, N1, N2, N3, and SEN. The signal SEN is a signal on a first terminal of the capacitor CS, and a second terminal of the capacitor CS is coupled to the reference voltage terminal VS. The signal N5 is the signal on a transmission line TFL.

The transmission lines TFL are coupled to the latches 411-414. The latch 411 includes a data maintainer BH1 and transistors MN8 and MN9. The data maintainer BH1 stores inverse data L0 and L0B, and the transistors MN8 and MN9 are respectively controlled by signals RSTD and SETD. The latch 412 includes a data maintainer BH2 and transistors MN10 and MN11. The data maintainer BH2 stores inverse data L1 and L1B, and the transistors MN10 and MN11 are respectively controlled by signals RST1 and SET1. The latch 413 includes a data maintainer BH3 and transistors MN12 and MN13. The data maintainer BH3 stores inverse data L3 and L3B, and the transistors MN12 and MN13 are respectively controlled by signals RST3 and SET3. The latch 414 includes a data maintainer BH4 and transistors MN14 and MN15. The data maintainer BH4 stores inverse data L2 and L2B, and the transistors MN14 and MN14 are respectively controlled by signals RST2 and SET2.

The transmission line TFL is further coupled to a bus DBUS through a transistor M1. The transistor M1 is controlled by a signal N4. The bus DBUS is coupled to the cache block 420. The cache block 420 has a latch composed of a data maintainer BH5 and transistors MN16 and MN17.

The data maintainer BH5 is used to store inverse search data CDL and CLDB. The transistors MN16 and MN17 are respectively controlled by signals RSTC and SETC.

Figure 5A:
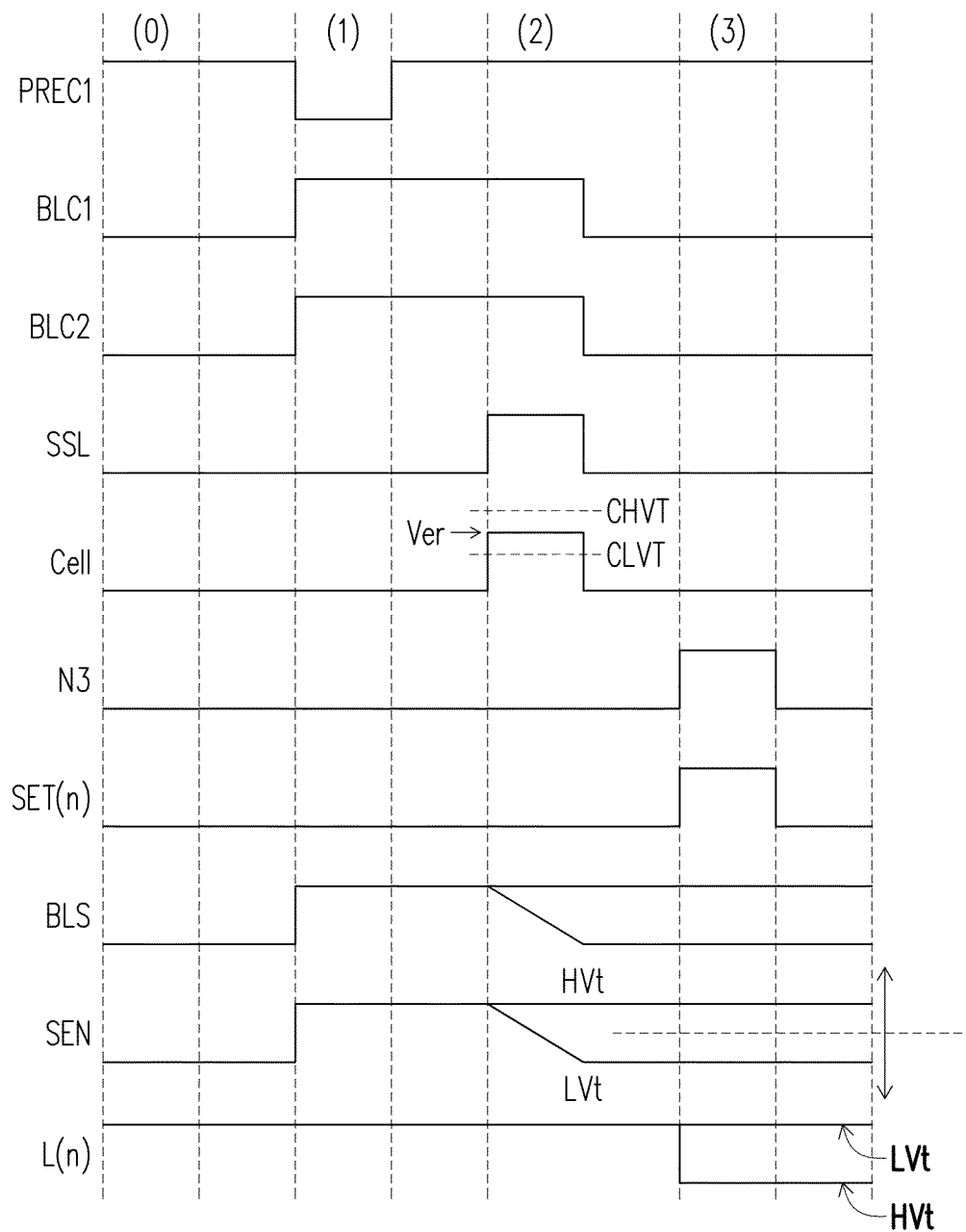
FIGS. 5A to 5C are operation waveform diagrams of the readout data sensor and comparator 400.
Figure 5B:
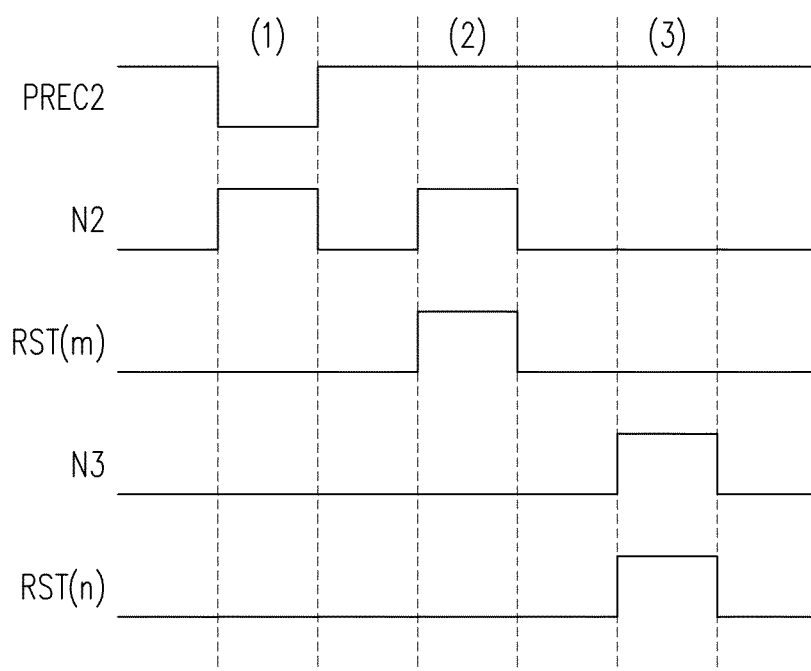
Figure 5C:
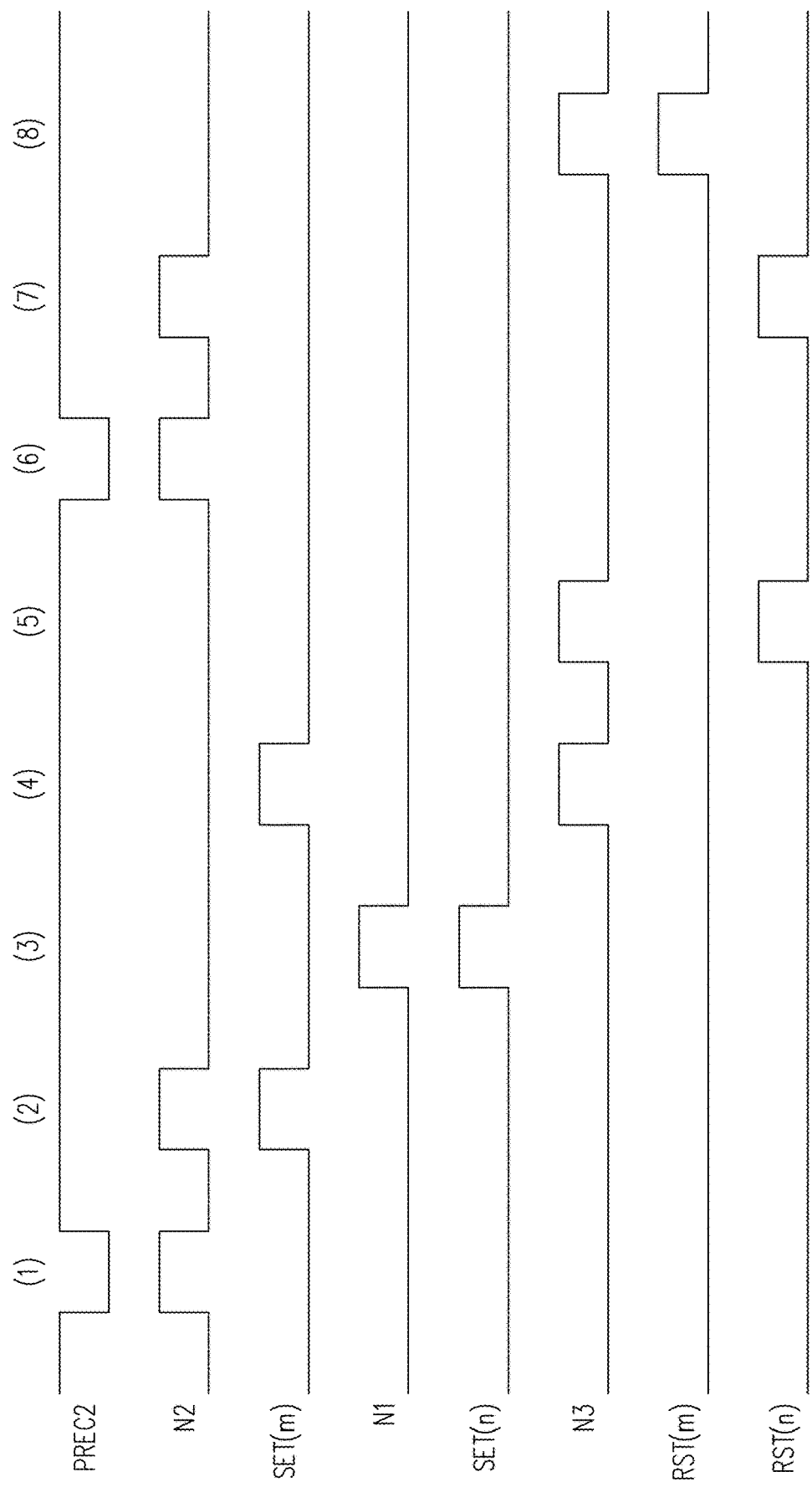

For details on the operation of the readout data sensor and comparator 400, please refer to the operation waveform diagrams of the readout data sensor and comparator 400 in FIGS. 5A to 5C. FIG. 5A shows the waveform of the readout data sensor and comparator 400 performing the sensing operation of reading data of the memory cell array. The data of the memory cell MC is read out and stored in one of the latches 411 to 414, and becomes a data L(n). The data L(n) may be any one of the data L0-L3. In stage (0), the data L(n) may first be set to logic value 1. In stage (1), the signals BLC1 and BLC2 are pulled up and the transistors MN1 and MN2 are turned on. At the same time, the signal PREC1 is pulled down so that the transistor MP1 is turned on and the signal SEN and a signal BLS on the bit line BL are charged to a high voltage value through the turned-on transistors MN1 and MN2.

In stage (2), a signal SSL is pulled up and a verify signal Ver is applied to the data Cell, and the data Cell stored in the memory cell MC is sent to the bit line BL. The signal BLS on the bit line BL and the signal SEN are maintained at a high voltage value or pulled down to a low voltage value corresponding to the data Cell stored in the memory cell MC. When the stored data Cell is greater than a first threshold voltage CHVt (wherein CHVt>Ver), the signals BLS and SEN may be maintained at a high voltage value. When the stored data Cell is less than a second threshold voltage CLVt (wherein CLVt<Ver), the signals BLS and SEN may be pulled down to a low voltage value. The first threshold is greater than the second threshold.

In stage (3), the signal N3 and the signal SET(n) (one of the signals SETD, SET1-SET3) on the latch corresponding to the data L(n) are pulled up, and the stored data Cell is transferred as the readout data, and stored in the corresponding latch. When the stored data Cell is the high voltage value HVt, the data L(n) may be logic value 0. When the stored data Cell is the low voltage value LVt, the data L(n) may be logic value 1.

FIG. 5B shows the operation waveform of the readout data sensor and comparator 400 for performing a logic AND operation between the data L(n)B and L(m). In the stage (1), the signal PREC2 is pulled down and the signal N2 is pulled up. The transistors MP2 and MN5 are turned on to precharge the transmission line TFL and pull up the signal SEN. Furthermore, in the stage (2), the signal N2 is pulled up again, and a signal RST(m) (one of the signals RSTD, RST1 to RST3) of a latch m (one of the latches 411 to 414) is pulled up, so that a data L(m)B (one of the data L0B-L3B) is equal to the signal SEN. In the stage (3), the signal N3 and a signal RST(n) (one of the signals RSTD, RST1 to RST3, but different from the signal RST(m)) of a latch n (another one of the latches 411 to 414) is pulled up, thereby allowing a data L(n)B (one of the data L0B-L3B, but different from the data L(m)B) and the signal on the transmission line TFL to perform AND logic operations. At this time, the signal on the transmission line TFL is equal to the signal reverse to the signal SEN. At this time, data L(n)B_n=the result of the AND operation of data L(n)B_o and data L(m). The data L(n)B_o is the data L(n)B before the operation, and the data L(n)B_n is the data L(n)B after the operation. The above relationship may be converted into, data L(n)_n=the result of performing an OR operation between data L(n)_o and the data L(m)B. The data L(n)_o is the data L(n) before the operation, and the data L(n)_n is the data L(n) after the operation.

In addition, FIG. 5C shows the operation waveform of the readout data sensor and comparator 400 performing the comparison operation. The stage (1) of FIG. 5C is the same as the stage (1) of FIG. 5B. In the stage (2), a signal SET(m) (one of the signals SETD, SET1-SET3) of the latch m and the signal N2 are pulled up, and the signal SEN and the data L(m) (one of the data L0-L3) is the same. In the stage (3), the signal SET(n) (another one of the signals SETD, SET1-SET3) of the latch n and the signal N1 are pulled up, and the signal SEN is equal to the result of the data L(m) and the data L(n)B performing the AND logic operation. In stage (4), the signals SET(m) and N3 are pulled up, and the data L(m) and the signal inverse to the signal SEN perform the AND logic operation, generating a new data L(m)_n. In stage (5), the signal N3 and the signal RST(n) of the latch n are pulled up, so that the data L(n)B and the signal inverse to the signal SEN perform the AND logic operation, generating a new data L (n)_n.

In stage (6), the signal PREC2 is pulled down again and the signal N2 is pulled up, and the signal SEN is precharged to logic value 1 again. In stage (7), the signal N2 and the signal RST(n) of the latch n are pulled up to make the signal SEN equal to the data L(n)B. And in stage (8), by pulling up the signals N3 and RST(m), the signal inverse to the signal SEN and the data L(m)B may perform the AND logic operation, generating a new data L(m)B.

In stage (8), based on the fact that the signal SEN is equal to the data L(n)B, the signal inverse to the signal SEN may be equal to the data L(n). Therefore, the AND logic operation of stage (8) may be regarded as the AND logic operation of the data L(n) and L(m)B. Based on the individual logic operation relationships between the data L(n) and L(m)B in the stages, it may be obtained that the new data L(m)B may be equal to the result of the XOR operation of the original data L(n) and the original data L(m).

That is to say, in this embodiment, by storing the search data in one latch and storing the readout data in another latch, the page buffer 402 of this embodiment may complete the bit-by-bit comparison between the search data and the readout data and generate comparison results.

Figure 6A:
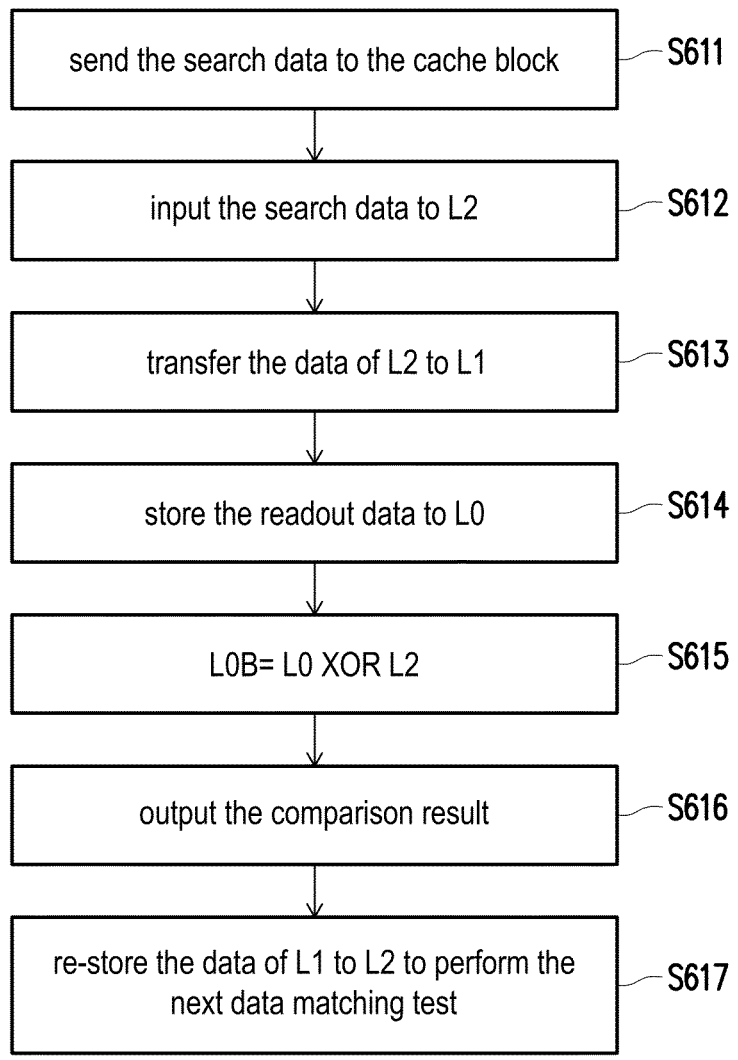
FIG. 6A and FIG. 6B illustrate a flow chart of the data comparison operation of the readout data sensor and comparator according to the embodiment of the disclosure.
Figure 6B:
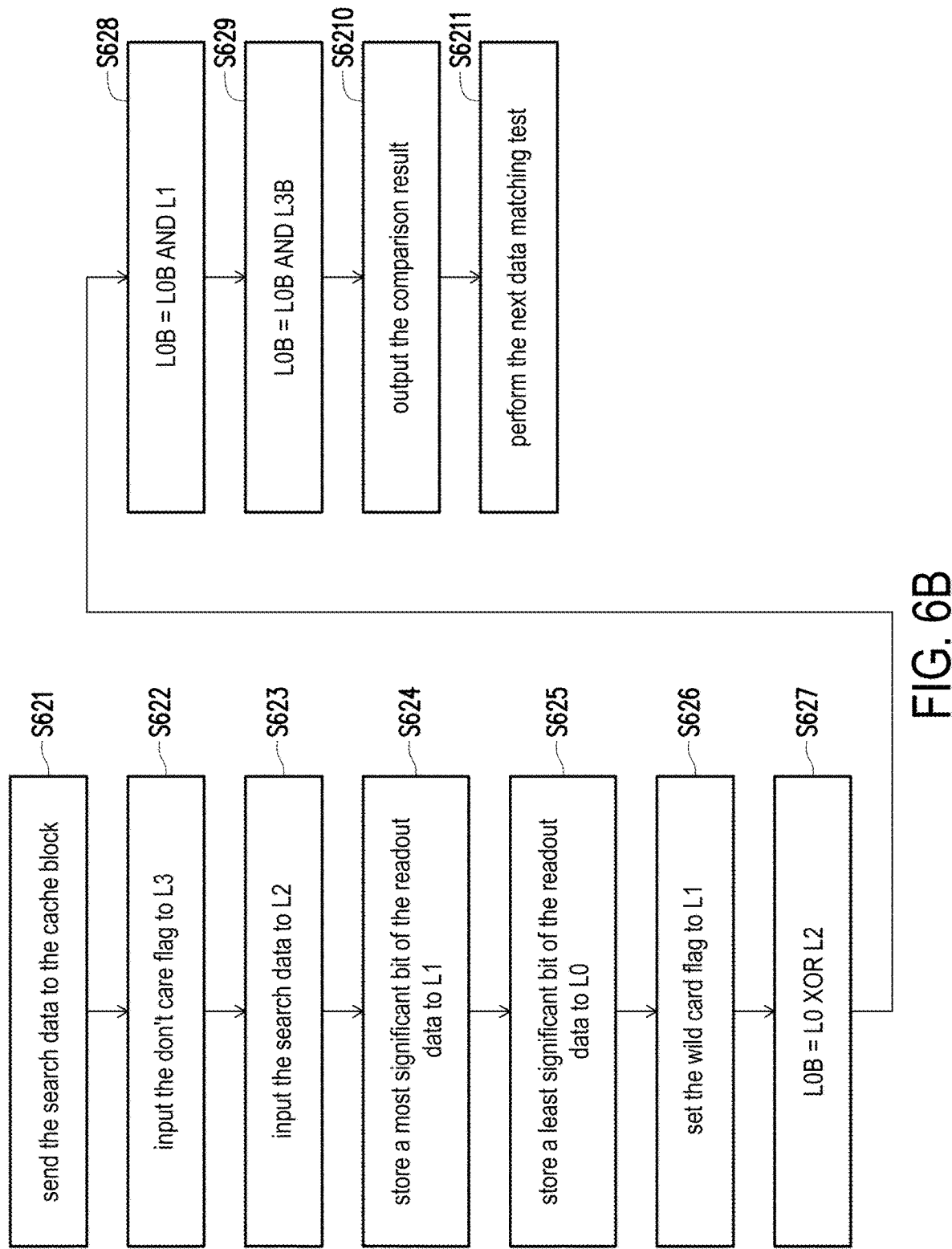

Referring to FIG. 6A and FIG. 6B, FIG. 6A and FIG. 6B illustrate flow charts of the data comparison operation of the readout data sensor and comparator according to the embodiment of the disclosure. The readout data sensor and comparator performs related operations through the page buffer. In FIG. 6A, both of the search data and the readout data are the binary data. In step S611, the search data is sent to the cache block. In step S612, the page buffer allows the search data to be input from the cache block and become the data L2 in the latch. In step S613, the page buffer allows the data L2 to be transferred to another latch to become the data L1. In step S614, the page buffer stores the readout data to become the data L0. In step S615, the page buffer may perform an XOR operation on the data L0 and L2 through the waveform operation of FIG. 5C, thereby generating the data L0B. In step S616, the page buffer may output the comparison result (equal to the data L0B at this time). In step S617, the page buffer may re-store the data L1 as the data L2, and thereby perform the next data matching test.

In FIG. 6B, the search data and the readout data may be the ternary data. In step S621, the search data is sent to the cache block. In step S622, the page buffer may input the don't care flag into the latch to become the data L3. In step S623, the page buffer further inputs the search data into another latch to become the data L2. In step S624, the page buffer allows a most significant bit of the readout data to become the data L1. In step S625, the page buffer allows a least significant bit of the readout data to become the data L0. In step S626, the page buffer sets the wild card flag as the data L1. In step S627, the page buffer performs the XOR operation on the data L0 and L2, and generates the data L0B.

In step S628, the page buffer performs the AND logic operation on the data L0B and L1, thereby updating the data L0B. In step S629, the page buffer performs the AND logic operation on the updated data L0B and the data L3B, thereby updating the data L0B again. In step S6210, the page buffer may output the data L0B as the comparison result. In step S6211, the page buffer may perform next data matching.

Figure 7A:
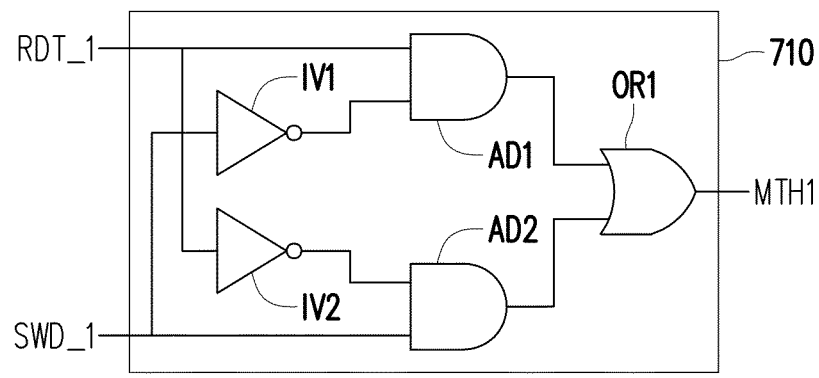
FIG. 7A and FIG. 7B are respectively schematic diagrams of different implementations of the comparison circuit in the readout data sensor and comparator according to the embodiment of the disclosure.
Figure 7B:
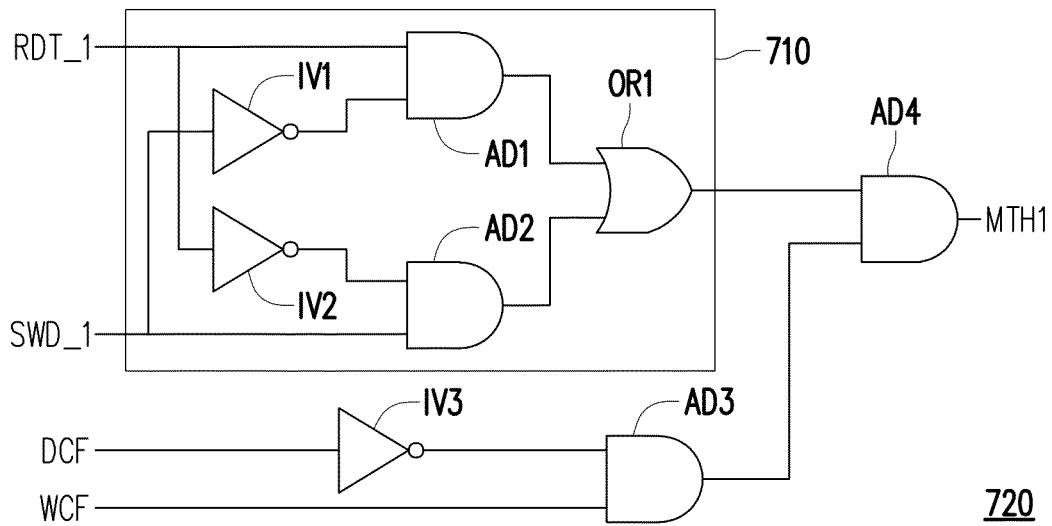

In this embodiment, the readout data sensor and comparator may be provided with a comparison circuit in addition to the page buffer, and perform the bit-by-bit comparison between the readout data and the search data through the comparison circuit. Referring to FIG. 7A and FIG. 7B below, FIG. 7A and FIG. 7B are respectively schematic diagrams of different implementations of the comparison circuit in the readout data sensor and comparator according to the embodiment of the disclosure. The comparison circuit is coupled between the page buffer and the cache block. In FIG. 7A, corresponding to a single bit of the readout data and the search data of the binary data, a comparison circuit 710 includes inverters IV1 and IV2, AND gates AD1 and AD2, and an OR gate OR1. An input terminal of the AND gate AD1 receives one bit RDT_1 of the readout data; another input terminal of the AND gate AD1 receives one bit SWD_1 of the search data through the inverter IV1; an output terminal of the AND gate AD1 is coupled to an input terminal of the OR gate OR1; an input terminal of the AND gate AD2 receives one bit SWD_1 of the search data; another input terminal of the AND gate AD2 receives one bit RDT_1 of the readout data through the inverter IV2; an output terminal of the AND gate AD2 is coupled to another input terminal of the OR gate OR1. The output terminal of the OR gate OR1 generates one bit MTH_1 of the comparison result.

The comparison circuit 710 provides the XOR operation with the same effect, and when the bit SWD_1 matches with the bit RDT_1, the bit MTH_1 with logic value 0 is generated; and when the bit SWD_1 does not match with the bit RDT_1, the bit MTH_1 with logic value 1 is generated.

In FIG. 7B, corresponding to a single bit of the readout data and the search data of the ternary data, a comparison circuit 720 adds an additional inverter IV3 and an AND gate AD3 outside the comparison circuit 710. The inverter IV3 receives a don't care flag DCF, and an output terminal of the inverter IV3 is coupled to an input terminal of the AND gate AD3. Another input terminal of the AND gate AD3 receives a wild card flag WCF. When the don't care flag DCF is logic value 1, the corresponding search data is indicated as don't care. When the wild card flag WCF is logic value 0, the corresponding readout data is indicated as wild card.

Similarly, the comparison circuit 720 provides the XOR operation with the same effect. When the comparison circuit 720 generates the bit MTH_1 with logic value 0, the comparison result is indicated as consistent. When the comparison circuit 720 generates the bit MTH_1 with logic value 1, the comparison result is indicated as inconsistent.

Figure 8:
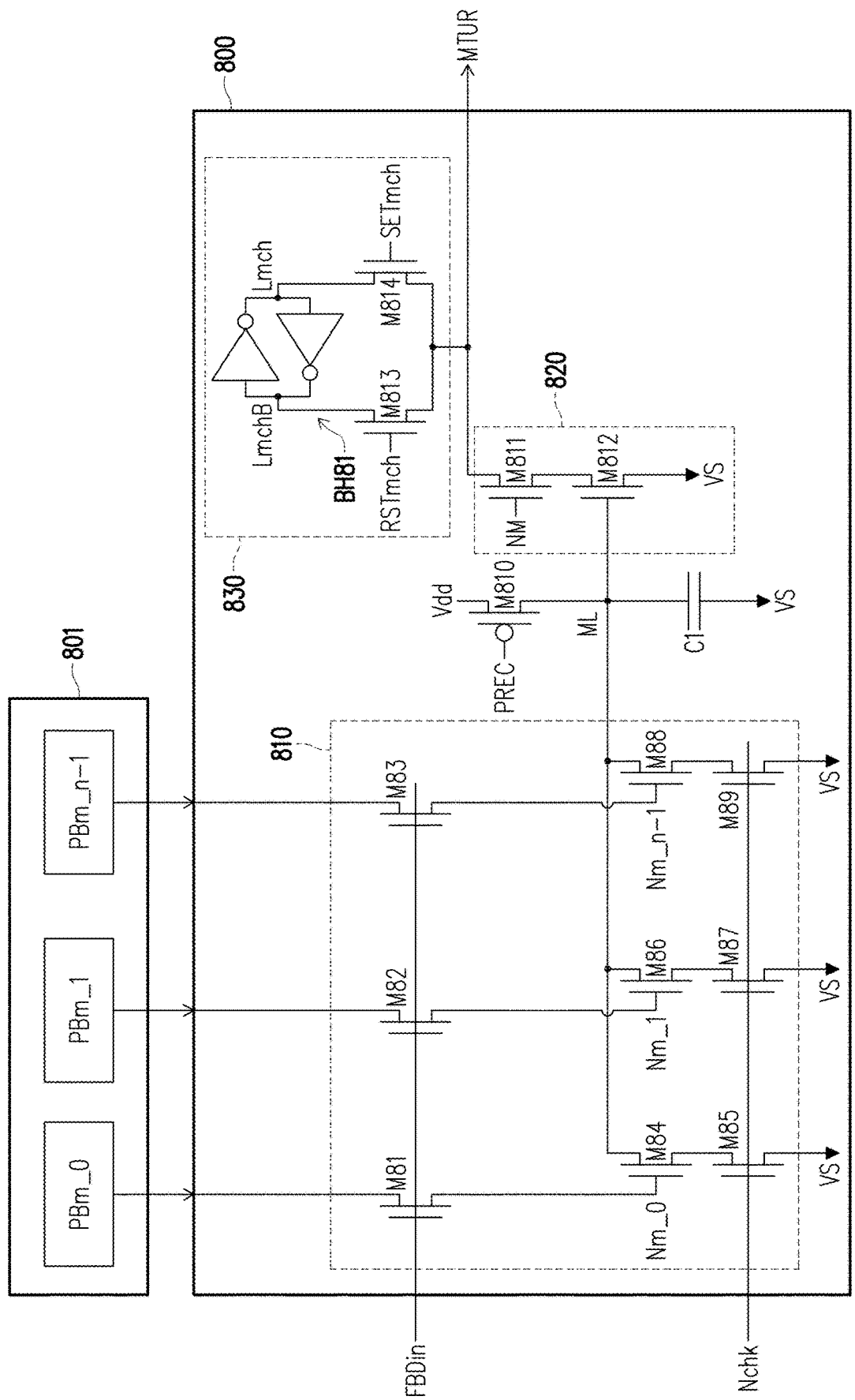
FIG. 8 is a schematic diagram of a matching test circuit in an error bit detector according to an embodiment of the disclosure.

Referring to FIG. 8, FIG. 8 is a schematic diagram of a matching test circuit in an error bit detector according to an embodiment of the disclosure. The error bit detector may include multiple matching test circuits. A matching test circuit 800 includes a capacitor C1, a current source 810, an output circuit 820, and a latch 830. The current source 810 is coupled to the capacitor C1 and coupled to a readout data sensor and comparator 801 to receive multiple sub-comparison results PBm_0-PBm_n−1 generated by the readout data sensor and comparator 801. The current source 810 provides a current according to the sub-comparison results PBm_0-PBm_n−1, and discharges the capacitor C1 by using the provided current. The voltage value on the capacitor C1 is used to generate a matching information MTUR.

In detail, the current source 810 includes transistors M81-M89. The transistors M81-M83 are respectively connected in series on transmission paths of the sub-comparison results PBm_0-PBm_n−1. The transistors M81-M83 are controlled by a signal PBDin to be turned on or off. The transistors M84, M85, and the transistor M81 are connected in series to the reference voltage terminal VS; the transistors M86, M87, and the transistor M82 are connected in series to the reference voltage terminal VS; the transistors M88, M89, and the transistor M83 are connected in series to the reference voltage terminal VS. Control terminals of the transistors M84, M86, and M88 respectively receive the sub-comparison results PBm_0-PBm_n−1, and provide a current flowing from a transmission line ML to the reference voltage terminal VS according to the sub-comparison results PBm_0-PBm_n−1 when the transistors M81-M83, M85, M87, and M89 are all turned on. The transistors M85, M87, and M89 are turned on or off according to a signal Nchk.

In this embodiment, when the sub-comparison results PBm_0-PBm_n−1 are the logic value 1, the corresponding transistors M84, M86, and M88 may generate a current. Therefore, the more the sub-comparison results PBm_0-PBm_n−1 with logic value 1, the faster the voltage on the transmission line ML may be pulled down. In contrast, when the sub-comparison results PBm_0-PBm_n−1 are logic value 0, the corresponding transistors M84, M86, and M88 are cut off and no current is generated.

The capacitor C1 is further coupled to a transistor M810. The transistor M810 may be turned on according to a signal PREC and provide a precharge current to precharge the capacitor C1 so that the voltage on the transmission line ML may be equal to a power supply voltage Vdd.

The output circuit 820 includes transistors M811 and M812. The transistors M811 and M812 are connected in series. The transistors M811 and M812 are respectively controlled by a signal NM and the voltage of the capacitor C1 coupled to a terminal point of the transmission line ML. A first terminal of the transistor M811 generates the matching information MTUR, and a second terminal of the transistor M812 is coupled to the reference voltage terminal VS.

The latch 830 is coupled to the first terminal of the transistor M811 to latch the matching information MTUR to obtain data Lmch and LmchB. The latch 830 includes a data maintainer BH81 and transistors M813 and M814. The transistors M813 and M814 are respectively controlled by signals RSTmch and SETmch.

Figure 9:
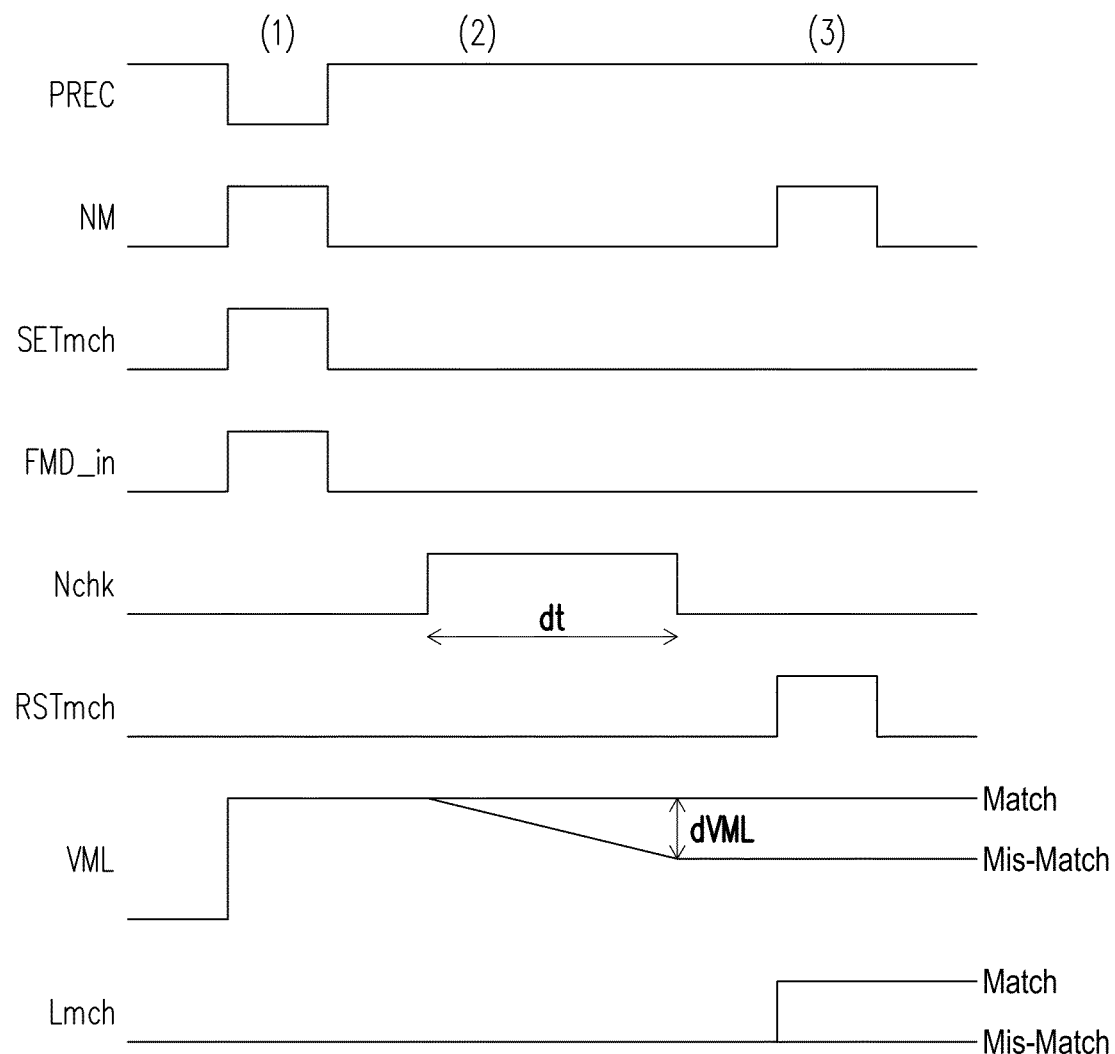
FIG. 9 illustrates an operation waveform diagram of the matching test circuit 800 according to the embodiment of FIG. 8 of the disclosure.

Referring to FIG. 9, FIG. 9 illustrates an operation waveform diagram of the matching test circuit 800 according to the embodiment of FIG. 8 of the disclosure. In stage (1), the signal PREC is pulled down, and the signals NM, SETmch, and FBDin are pulled up. At this time, a voltage VML on the transmission line ML is precharged to a high voltage value, and the sub-comparison results PBm_0-PBm_n−1 are written to the control terminals of the transistors M84, M86, and M88 through the transistors M81-M83.

In stage (2), the signal Nchk is pulled up and maintained for a delayed time dt, and the transistors M85, M87, and M89 are turned on. Correspondingly, the transistors M84, M86, and M88 generate the current to discharge the capacitor C1, and the voltage VML may decrease over time. A decreasing rate of the voltage VML is related to the number of the sub-comparison results PBm_0-PBm_n−1 with logic value 1. In some embodiments, the voltage VML may not decrease.

In stage (3), the signals NM and RSTmch are pulled up. At this time, a degree of decrease of the voltage VML is greater than or equal to a threshold dVML, or the original voltage value is maintained without decreasing. The latch 830 may obtain the data Lmch that is logic value 0 or 1 by latching the matching information MTUR. In this embodiment, when all the sub-comparison results PBm_0-PBm_n−1 indicate that the comparison results are consistent (match), the sub-comparison results PBm_0-PBm_n−1 are all logic value 0, and the voltage value of the voltage VML may be determined as not decreasing in the stage (3). Correspondingly, the data Lmch may be logic value 1. When there are enough sub-comparison results PBm_0-PBm_n−1 indicating that the comparison results are inconsistent (mismatch), some or all of the sub-comparison results PBm_0-PBm_n−1 may be logic value 1, and the voltage value of the voltage VML may be determined as decreasing to the low voltage value in the stage (3). Correspondingly, the data Lmch may be logic value 0.

Figure 10:
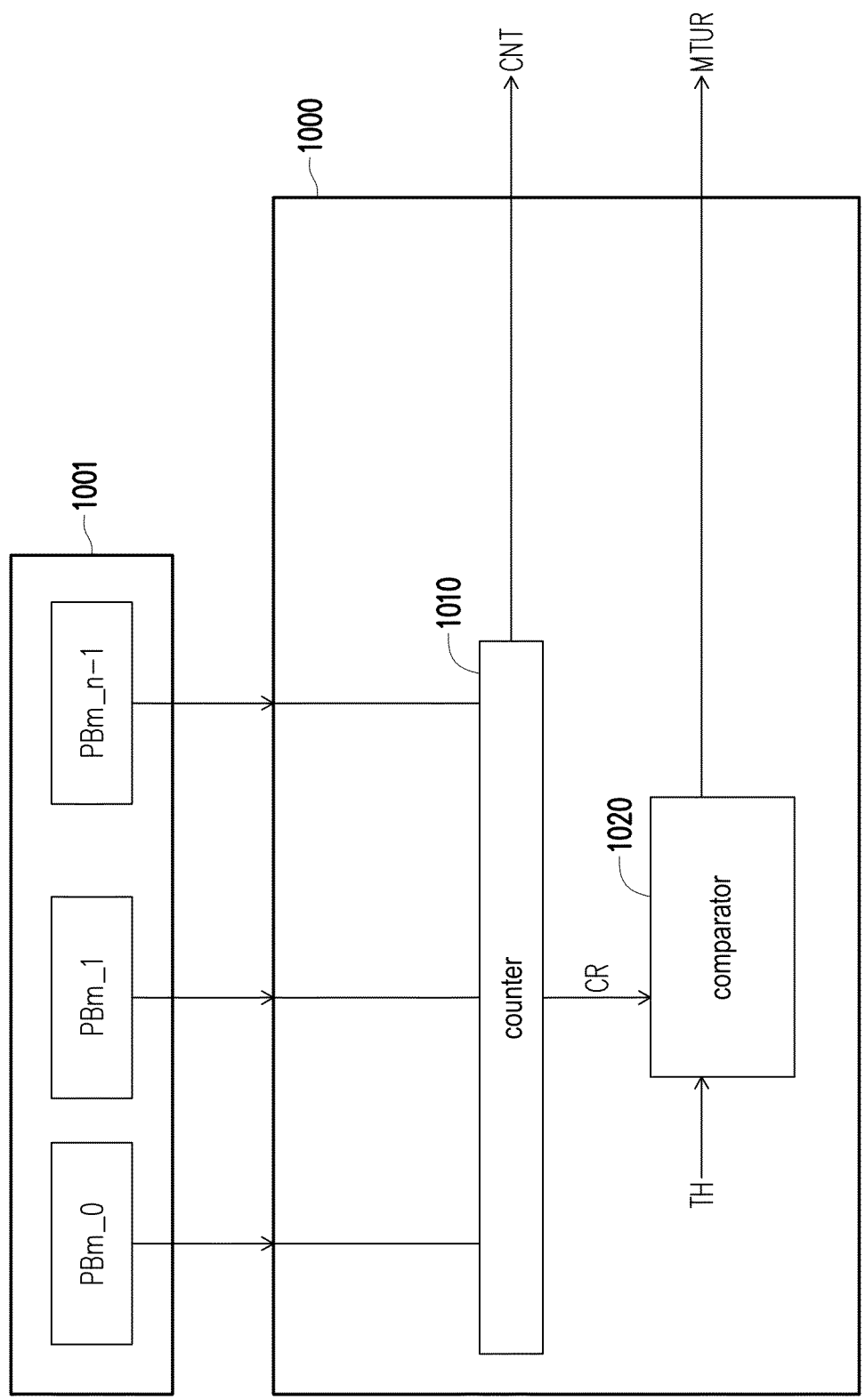
FIG. 10 is a schematic diagram of another implementation of a matching test circuit in an error bit detector according to an embodiment of the disclosure.

Referring to FIG. 10, FIG. 10 is a schematic diagram of another implementation of a matching test circuit in an error bit detector according to an embodiment of the disclosure. A matching test circuit 1000 is an implementation of a digital circuit. The matching test circuit 1000 includes a counter 1010 and a comparator 1020. The counter 1010 is used to receive the sub-comparison results PBm_0-PBm_n−1 generated by a readout data sensor and comparator 1001, and to count the number of the sub-comparison results PBm_0-PBm_n−1 that are logic value 0 (or logic value 1) to generate a counting result CR. The comparator 1020 is used to compare the counting result CR with a preset threshold TH, and thereby generate the matching information MTUR.

The counter 1010 also outputs a counting result CNT of a number of error bits in the counting result CR.

In this embodiment, both the comparator 1020 and the counter 1010 may be implemented using digital comparators and digital counters that are well known to those skilled in the art, and there are no certain limitations.

Figure 11:
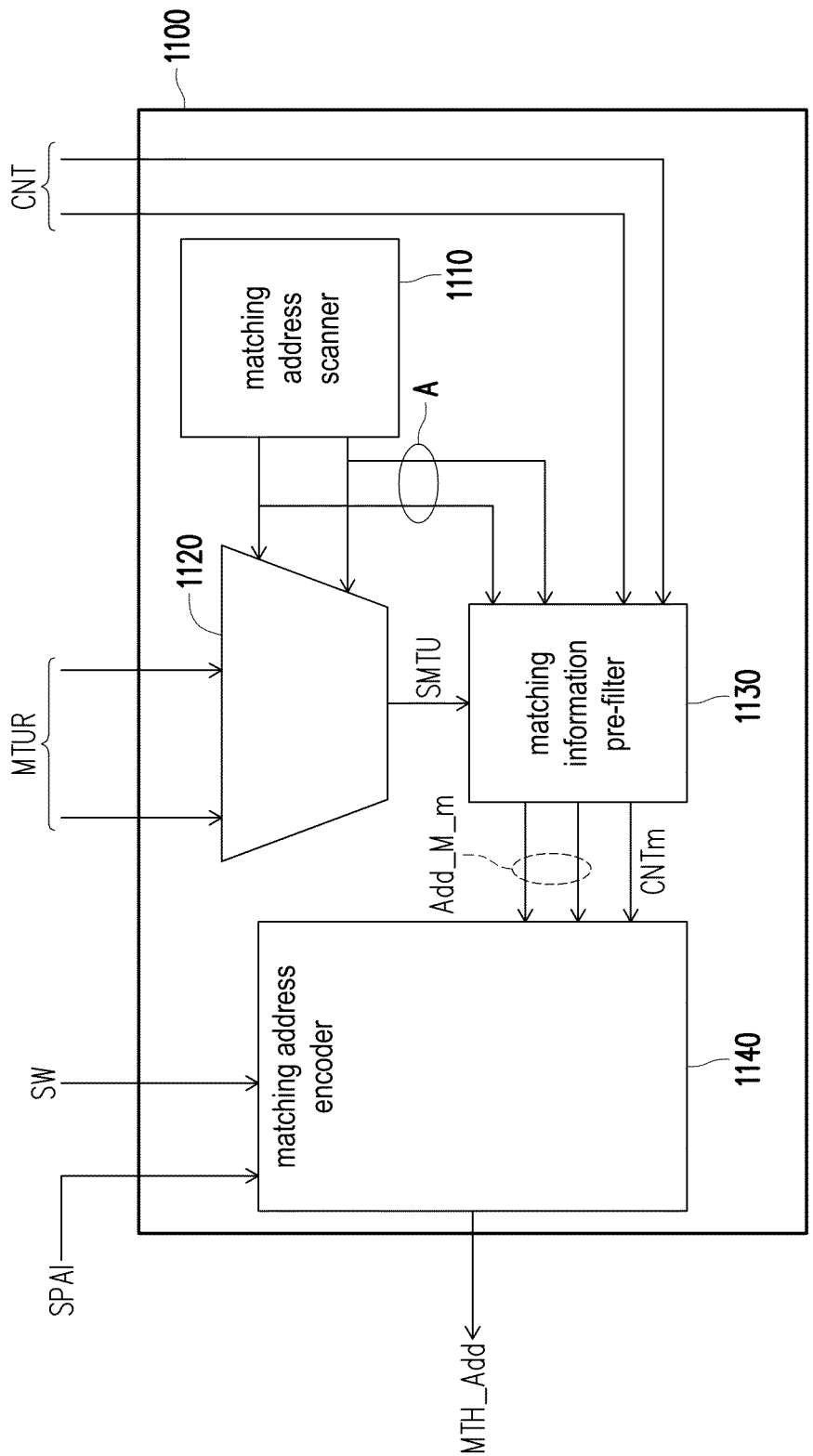
FIG. 11 is a block diagram of a matching status processor according to an embodiment of the disclosure.

Referring to FIG. 11, FIG. 11 is a block diagram of a matching status processor according to an embodiment of the disclosure. The matching status processor 1100 includes a matching address scanner 1110, a multiplexer 1120, a matching information pre-filter 1130, and a matching address encoder 1140. The matching address scanner 1110 is used to generate a scan signal A. The scan signal A may have multiple bits, and during the scanning process, the matching address scanner 1110 causes the scan signal A to increase by 1 step by step along with the steps of the scanning operation.

The multiplexer 1120 receives the matching information MTUR, and sequentially outputs each bit of the matching information MTUR according to the scan signal A to generate a selected matching information SMTU. The matching information pre-filter 1130 receives the scan signal A, the selected matching information SMTU generated by the multiplexer 1120, and a counting result CNTm corresponding to each of the sub-comparison results, and generates a filtered output information Add_M_m.

The matching address encoder 1140 generates the matching address information MTH_ADD based on the filtered output information Add_M_m, the scanned address information SPAI, and the counting result CNTm of an index command SW.

In this embodiment, the matching address scanner 1110, the multiplexer 1120, the matching information pre-filter 1130, and the matching address encoder 1140 may all be designed using digital circuits, and there are no certain limitations on the related circuit architecture.

Figure 12:
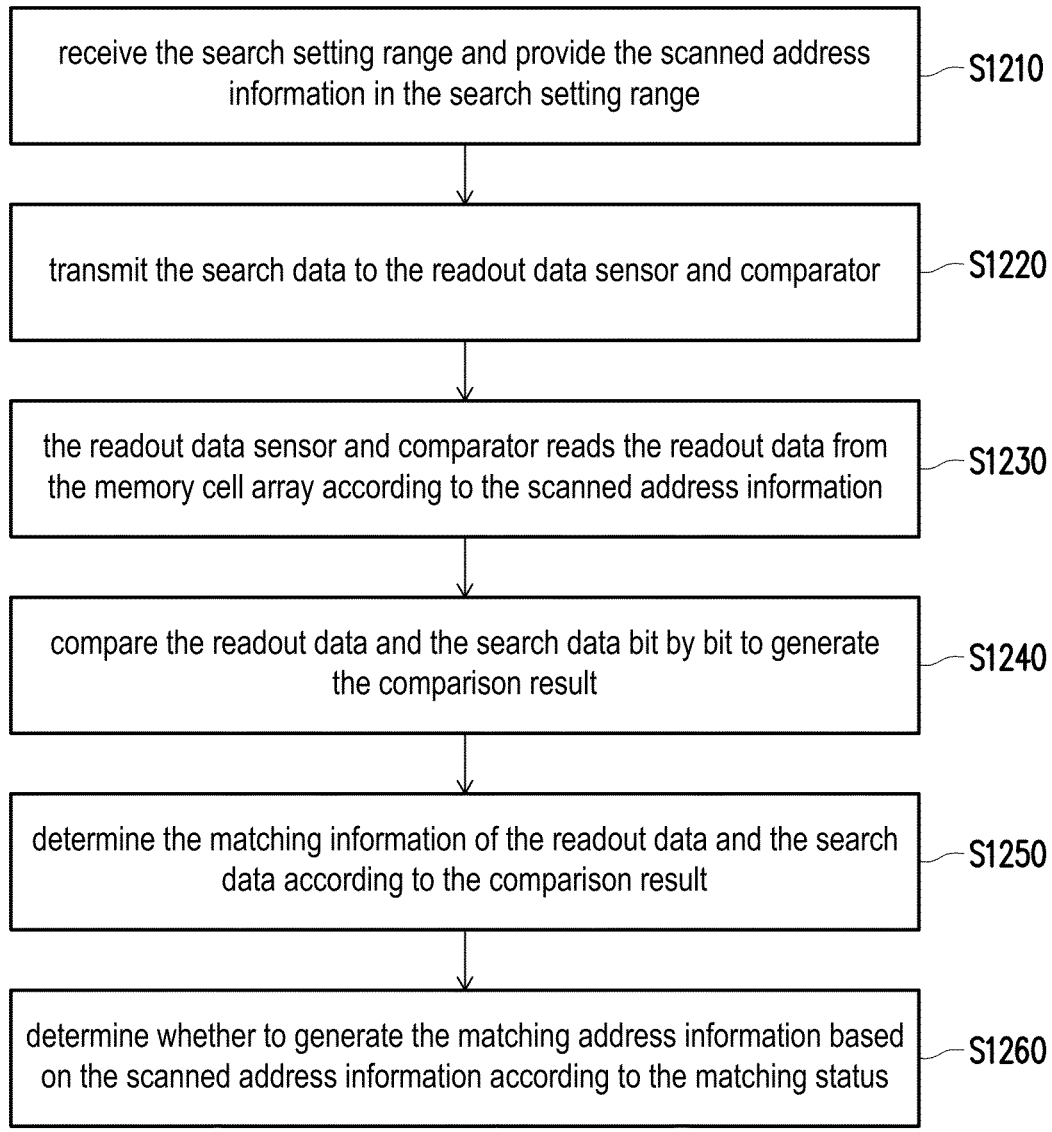
FIG. 12 is a flow chart of an in-memory searching method according to an embodiment of the disclosure.

Referring to FIG. 12, FIG. 12 is a flow chart of an in-memory searching method according to an embodiment of the disclosure. In step S1210, the memory device receives the search setting range and provides the scanned address information in the search setting range. In step S1220, the search data is transmitted to the readout data sensor and comparator. In step S1230, the readout data sensor and comparator reads the readout data from the memory cell array according to the scanned address information. In step S1240, the readout data and the search data are compared bit by bit to generate the comparison result. In step S1250, the memory device determines the matching information of the readout data and the search data according to the comparison result. In step S1260, the memory device determines whether to generate the matching address information based on the scanned address information according to the matching status.

The implementation details of the above steps have been described in detail in the foregoing embodiments and implementations, and thus are not repeated herein.

Figure 13:
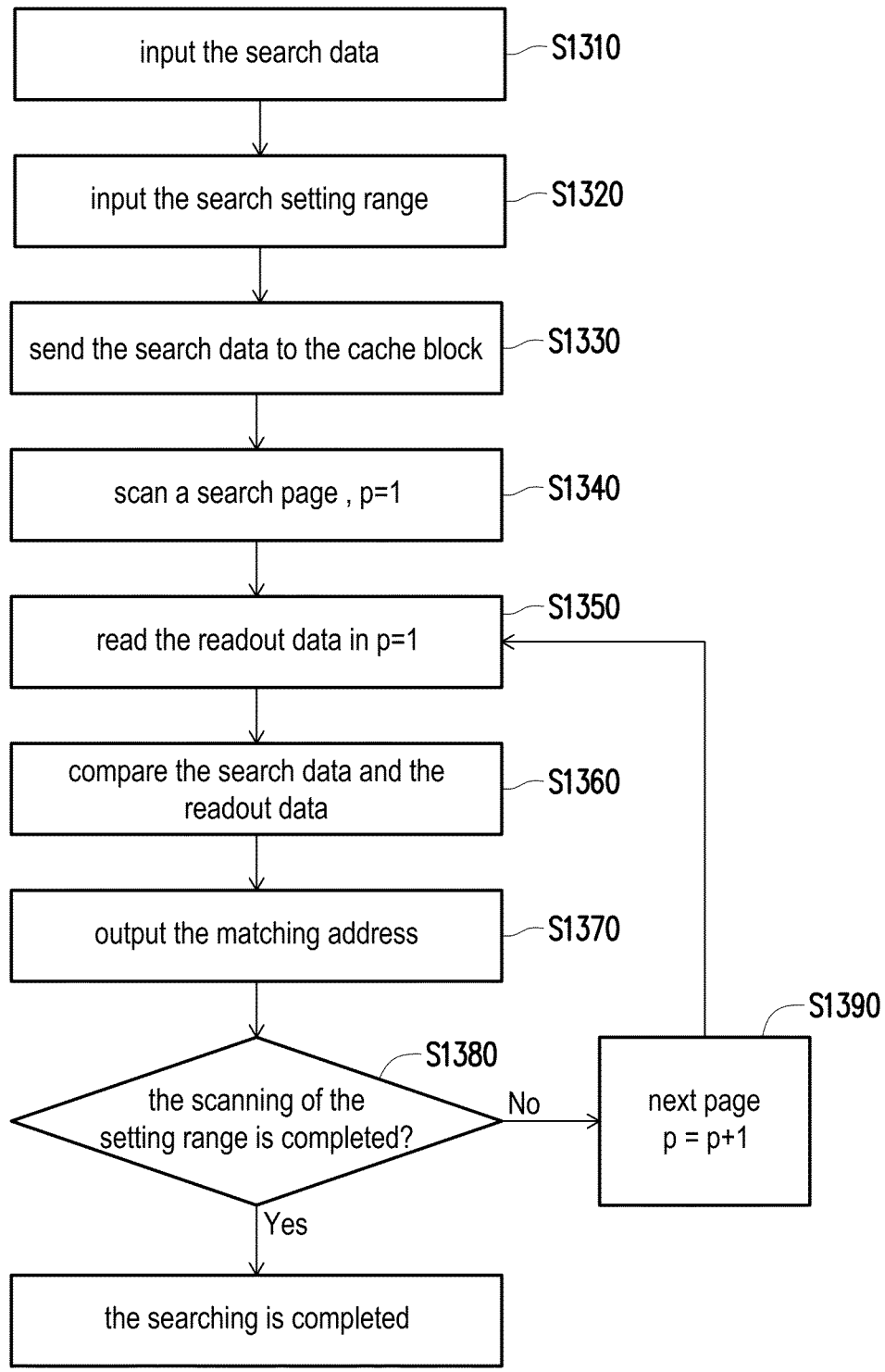
FIG. 13 is a flow chart of another implementation of an in-memory searching method according to an embodiment of the disclosure.

Referring to FIG. 13, FIG. 13 is a flow chart of another implementation of an in-memory searching method according to an embodiment of the disclosure. In step S1310, an input operation of the search data is performed on the memory device. In step S1320, an input operation of the search setting range is performed on the memory device. In step S1330, the memory device allows the search data to be input into the cache block. In step S1340, the memory device scans a search page P=1, and reads the readout data in the search page P=1 in step S1350.

Next, in step S1360, the readout data and the search data is compared bit by bit. In step S1370, the matching address is generated and output based on the comparison operation.

In step S1380, the scanning and searching of all of the memory pages in the setting range are determined to be completed. In response to a determination result being no, P is incremented by 1 (P=P+1) in step S1390, and step S1350 is returned to execution. In response to the determination result being yes, the search is completed.

In summary, the disclosure compares the readout data and the search data in the memory page bit by bit by the readout data sensor and comparator to generate the comparison result. Through the analysis operation of comparing the results, the matching address information of the page address that matches the search data is obtained. The memory device of the disclosure may perform the searching operation of the search data of a page data width, thereby improving the efficiency of in-memory searching operations.

What is claimed is:

1. A memory device, comprising:
   an address scanner, receiving a search setting range and providing a scanned address information within the search setting range;
   a searching data transmitter, configured to transmit a search data;
   a readout data sensor and comparator, reading a readout data from a memory cell array according to the scanned address information and comparing the readout data and the search data bit by bit to generate a comparison result, wherein the readout data sensor and comparator comprises:
   a page buffer, configured to store the readout data, wherein the page buffer is divided into a plurality of sub-buffers, the readout data is divided into a plurality of readout sub-data the plurality of sub-buffers respectively store the plurality of readout sub-data and respectively compare the plurality of readout sub-data with a plurality of sub-search data to respectively generate a plurality of sub-comparison results;
   an error bit detector, coupled to the readout data sensor and comparator and determining a matching information of the readout data and the search data according to the comparison result; and
   a matching status processor, coupled to the error bit detector and determining whether to generate a matching address information based on the scanned address information according to the matching information.

2. The memory device according to claim 1, further comprising:
   a cache block, coupled between the searching data transmitter and the readout data sensor and comparator, configured to store the search data, and providing the search data to the readout data sensor and comparator.

3. The memory device according to claim 1, wherein the page buffer comprises:
   a sense amplifier, coupled to a bus; and
   a plurality of latches, coupled to the bus.

4. The memory device according to claim 1, wherein the readout data sensor and comparator comprises:
   a page buffer, configured to store the readout data; and
   a comparison circuit, configured to compare the readout data and the search data bit by bit.

5. The memory device according to claim 4, wherein the comparison circuit is configured to allow a plurality of bits of the readout data to respectively perform XOR logic operations with a plurality of bits of the search data.

6. The memory device according to claim 1, wherein the error bit detector comprises:
   a plurality of matching test circuits, wherein each of the plurality of matching test circuits generates the matching information according to the corresponding each of the plurality of sub-comparison results.

7. The memory device according to claim 6, wherein each of the plurality of matching test circuit comprises:
   a capacitor, receiving a pre-charge current to be pre-charged;
   a current source, coupled to the capacitor and determining whether to provide a current to discharge the capacitor based on each of the plurality of sub-comparison results:
   an output circuit, coupled to the capacitor and generating the matching information according to a voltage value on the capacitor; and
   a latch, configured to latch the matching information.

8. The memory device according to claim 6, wherein each of the plurality of matching test circuit comprises:
   a counter, counting each of the plurality of sub-comparison results to generate a counting result; and
   a comparator, comparing the counting result with a threshold to generate the matching information.

9. The memory device according to claim 8, wherein the matching status processor comprises:
   a matching address scanner, generating a scan signal;
   a multiplexer, receiving the matching information and sequentially outputting each of the bits of the matching information according to the scan signal to generate a selected matching information;
   a matching information pre-filter, receiving the scan signal, the selected matching information generated by the multiplexer, and the counting result corresponding to each of the plurality of sub-comparison results, and generating a filtered output information; and a matching address encoder, generating the match address information according to the filtered output information, the scanned address information, and an index command.

10. The memory device according to claim 1, wherein the searching data transmitter sets a number of a sub-search data comprised in the search data according to an index command.

11. The memory device according to claim 10, wherein the sub-search data is a binary data or a ternary data.

12. An in-memory searching method, comprising:
receiving a search setting range and providing a scanned address information in the search setting range;
transmitting a search data to a readout data sensor and comparator;
reading a readout data from a memory cell array by the readout data sensor and comparator according to the scanned address information;
comparing the readout data and the search data bit by bit to generate a comparison result, comprising:
dividing a page buffer in the readout data sensor and comparator into a plurality of sub-buffers;
dividing the readout data into a plurality of read sub-data;
respectively storing the plurality of read sub-data in the plurality of sub-buffers; and
respectively comparing the plurality of read sub-data with a plurality of sub-search data to respectively generate a plurality of sub-comparison results;
determining a matching information of the readout data and the search data according to the comparison result; and
determining whether to generate a matching address information based on the scanned address information according to the matching information.

13. The in-memory searching method according to claim 12, wherein transmitting the search data to the readout data sensor and comparator comprises:
transferring the search data to a cache block; and
providing the search data to the readout data sensor and comparator by the cache block.

14. The in-memory searching method according to claim 12, further comprising:
providing a comparison circuit so that a plurality of bits of the readout data performs XOR logic operations with a plurality of bits of the search data.

15. The in-memory searching method according to claim 12, further comprising:
setting a number of a sub-search data comprised in the search data according to an index command.

16. The in-memory searching method according to claim 15, further comprising:
wherein the sub-search data is a binary data or a ternary data.

* * * * *